United States Patent [19]

von Bogdandy et al.

[11] Patent Number: 4,993,689

[45] Date of Patent: Feb. 19, 1991

[54] CONVERTOR FOR CONTINUOUSLY MELTING SCRAP WITH TAPPING MEANS

[75] Inventors: Ludwig von Bogdandy, Linz; Gerhard Mitter, Traun; Otto Köller; Luzian Pochmarski, both of Leoben, all of Austria

[73] Assignee: Voest Alpine Stahl Donawitz Gesellschaft m.b.H., Leoben-Donawitz, Austria

[21] Appl. No.: 428,774

[22] Filed: Oct. 30, 1989

Related U.S. Application Data

[62] Division of Ser. No. 278,543, Dec. 1, 1988, Pat. No. 4,895,594.

[30] Foreign Application Priority Data

Dec. 17, 1987 [AT] Austria ............................... 3341/87

[51] Int. Cl.⁵ ............................................. F27B 14/18
[52] U.S. Cl. ..................................... 266/79; 266/165; 266/236; 222/593
[58] Field of Search ................... 222/593; 266/79, 165, 266/236

[56] References Cited

U.S. PATENT DOCUMENTS 4,795,139  1/1989  Vallomy ........................... 266/236

FOREIGN PATENT DOCUMENTS 1360793  7/1974  United Kingdom ............... 266/236

Primary Examiner—Melvyn J. Andrews
Attorney, Agent, or Firm—Cushman, Darby & Cushman

[57] ABSTRACT

In a process for continuously melting scrap (6) and/or pig iron within a converter (1), the converter (1) is heated in proximity of the bottom (3) with sub-stoichiometric burners (4), having their flames (5) essentially radially directed into the interior of the converter (1). In this case, secondary air or $O_2$ is supplied at a distance above the burner plane for the purpose of completing the combustion. The melt is, optionally together with slag, discharged via a tapping means (9) laterally connected to the converter (1) into a mobile ladle (19). For the purpose of interchanging ladles (19), the converter (1) is swivelled into a position in which the level of the melt is located below the taphole (11).

6 Claims, 1 Drawing Sheet

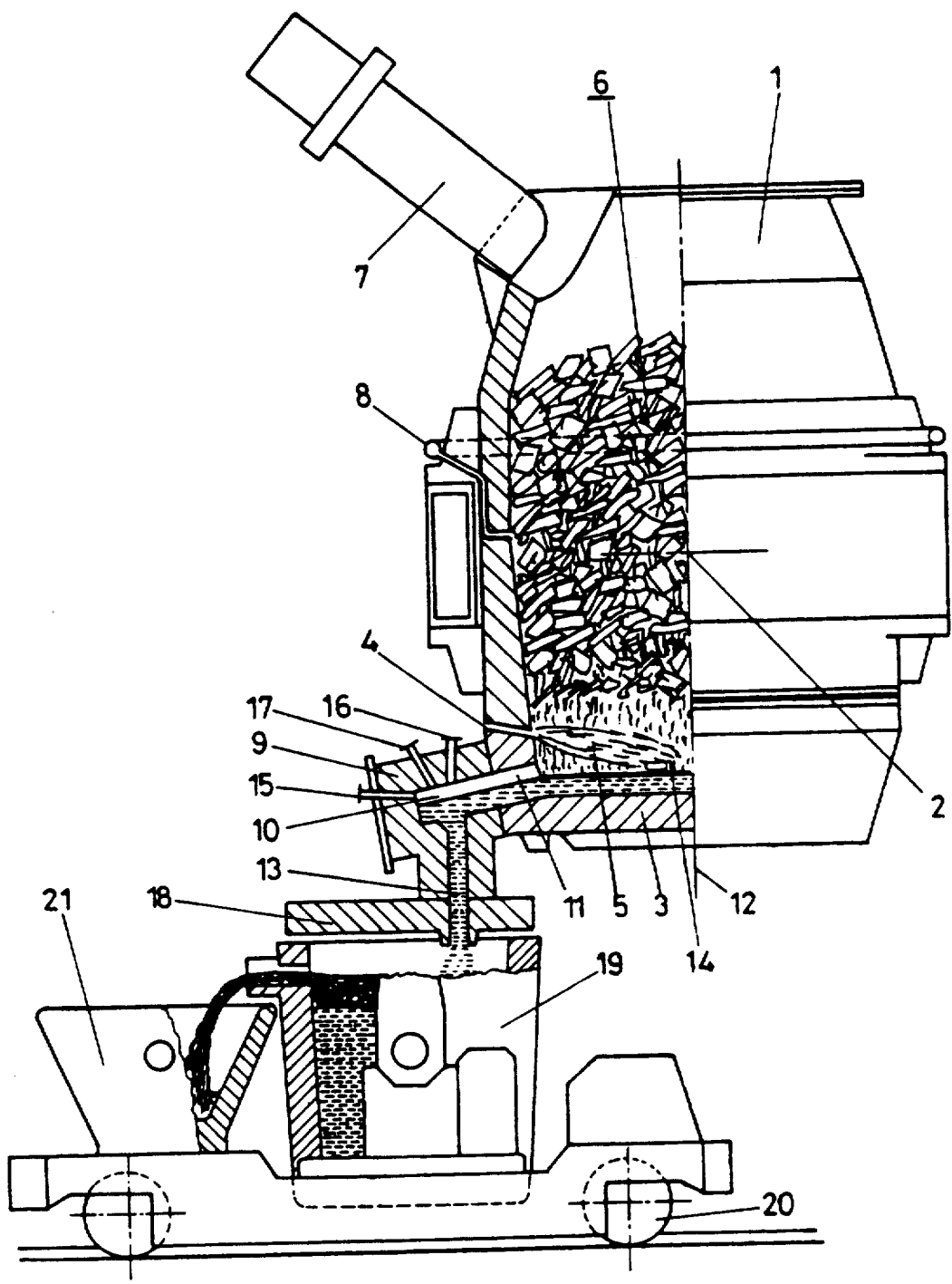

CONVERTOR FOR CONTINUOUSLY MELTING SCRAP WITH TAPPING MEANS

This is a division of Application No. 07/278,543, filed Dec. 1, 1988 now U.S. Pat. No. 4,895,594.

BACKGROUND OF THE INVENTION

1. Field of the Invention

The invention refers to a process for continuously melting scrap and/or pig iron within a converter as well as to an apparatus for performing this process.

2. Description of the Prior Art

There are already known allothermic converter processes in which scrap is preheated and/or molten, noting that such processes are optionally performed with the addition of pig iron. Expensive tiltable furnaces have been proposed for performing such processes, noting that a substantial drawback of the known processes resides in the fact that they are discontinuously operated in batches, because the crucible comprises no devices whatsoever for continuously discharging the molten material.

Heating of the known allothermic furnaces for preheating scrap and/or molten material is, as a rule, effected by means of bottom nozzles blowing mixtures of carbon and oxygen into the bottom pool or by means of blowing fuels together with oxygen via a lance introduced from above.

The so-called KVA-process is performed with a metallic charge as well as with coal and additives, noting that it is known to supply in this KVA-process the required melting heat by means of burners being operated with natural gas and oxygen. The melting crucibles having been proposed up till now for the KVA-process comprise a taphole on the bottom, which taphole does, however, not provide the possibility of simple continuous operation. In these known processes it has already been possible to move mobile ladles in a position below the taphole, thereby discharging together with the molten bath also the slag and effecting slag removal from the subsequent ladle. On account of the taphole being provided on the bottom of the receptacle, only a small amount of slag could be retained within the melting receptacle or, respectively, melting crucible even in case of a tiltable melting crucible, so that, when performing the melting process on a continuous basis, a corresponding amount of slag had to be produced for the purpose of obtaining a constant quality.

SUMMARY OF THE INVENTION

The invention now aims at providing a process of the initially mentioned type which provides the possibility to perform the melting process on a continuous basis and with a constant quality of the bath. For solving this task, the process according to the invention essentially consists in that the converter is heated in proximity of the bottom with sub-stoichiometric burners having their flames essentially radially directed into the interior of the converter, in that secondary air or $O_2$ is supplied at a distance above the burner plane for the purpose of completing the combustion, in that the melt is, optionally together with slag, discharged into a mobile ladle via a tapping means laterally connected to the converter and in that the converter is, for interchanging ladles, swivelled into a position in which the level of the molten material is located below the taphole. On account of the converter being heated in proximity of its bottom with sub-stoichiometric burners having their flames oriented in substantially radial direction into the interior of the converter, the ratio between natural gas and oxygen can, in particular when using burners being operated with natural gas and oxygen, be controlled in such a manner that the desired flame temperatures and the desired degree of oxidation is obtained. The use of sub-stoichiometric burners results in improving the yield in iron and in reducing the oxidation losses. On account of now supplying secondary air or oxygen at a distance above the burner plane for the purpose of completing the combustion, the chemically bound heat is substantially completely utilized and the continuously supplied charge is preheated to a high extent, so that the process is accelerated. The unburnt proportion of fuel is, by means of controllable amounts of air as far as possible burnt within these post-combustion nozzles, so that the scrap column is preheated in this manner. On account of discharging the melt, optionally together with slag via a tapping means laterally connected to the converter into a mobile ladle, there is provided the possibility to retain within the converter, when swivelling the same, a sufficient amount of slag, so that the continuous melting process is in no manner disturbed after having interchanged the mobile ladle and having swivelled back the converter. Slag having optionally been discharged together with the molten bath can be separated in the receiving ladle just located below the converter, noting that the laterally protruding tapping means allows to retain within the converter a sufficient volume of slag already in case of small tilting angles. It is possible to retain within the converter the metallic material still subjected to the melting process also when interchanging the ladles, thereby maintaining the continuity of the process, for which purpose it is already sufficient to tilt the converter, when interchanging ladles, into a position in which the level of the melt is located below the taphole.

The inventive apparatus for performing this process has a converter and is essentially characterized in that a plurality of burner nozzles extending in essentially radial direction is arranged on the converter within a plane located in proximity of the converter bottom, in that air nozzles are arranged within a further plane located at a higher level and in that a jutty-shaped tapping means is connected to the converter via a radial taphole. It is of substantial importance for the apparatus according to the invention that the jutty-shaped tapping means is connected to the converter by a radial taphole, said tapping means improving the kinematics of the tilting operation insafar as interchanging of ladles without dripping becomes possible also in case of small tilting angles. This embodiment is advantageously further developed such that the jutty-shaped tapping means has a substantial radial channel being in alignment with the radial taphole of the converter and that a tapping channel extending in essentially parallel relation to the axis of the converter is connected to the substantially radial channel, noting that such an angular design of the channels within the tapping means provides the possibility to do with only small tilting angles when interchanging ladles and provides the possibility to arrange auxiliary equipment warranting the continuity of the process. Thereto, the jutty-shaped tapping means comprises at least one burner whose flame is directed in one of both respective channels. Such burners being connected to the jutty-shaped tapping means prevent solidification of the molten bath within the channels during the stage of interchanging ladles, which solidification might cause an interruption of the continuous process. In this case, it is of advantage to direct burners into both channels, i.e. into the substantial radial channel being in alignment with the radial taphole of the converter as well as into the further channel being arranged at an angle relative to said first channel, so that a homogenous temperature distribution is reliably established.

It is of advantage to select the arrangement according to the invention such that the channel, which is connected to the radial taphole of the tapping means, has a greater free cross section than the channel, which is parallel relative to the axis of the converter, of the tapping means, so that there is provided the possibility to connect burners to a space being free of melt of the substantially radial first channel. In this case, it is possible to keep the burner nozzles free of any direct influence of the molten bath and, in this case, the arrangement is in a particularly simple manner selected such that there are connected to that channel of the tapping means which is connected to the radial taphole two burners with mutually crossing or intersecting flame axes and a closeable sampling opening. The additionally provided sampling opening entering this channel, provides the possibility to continuously monitor the process and to control the burners of the converter in a correspondingly desired manner.

Particularly rapid interchanging of the mobile ladles is made possible if the arrangement is such that the exit end of the tapping channel of the jutty-shaped tapping means carries a cover for the ladle being movable in a position below the tapping channel, said cover being tiltable in common with the converter and being adapted for being lifted off the ladle. On account of the cover of the subsequent ladle being connected with the converter or, respectively, the jutty-shaped tapping means, changing of the ladle can be effected in a particularly rapid manner, so that the process is interrupted for only a very small interval.

The burners of the converter are preferably operated with oxygen deficiency, which results in a λ-value of 0.8 to 0.9. The non-burnt portions of the natural gas, in particular CO und $CH_4$, flow, together with the effluent gases, in upward direction and are completely burnt within the area of the plane for supplying secondary air. As compared with a shaft furnace, the use of a converter allows simple tilting movement when changing the ladle, and the apparatus according to the invention may directly be obtained in practice by changing the construction of existing converters, for example by changing the construction of LD-converters. As compared with known tiltable furnace constructions, the tiltable suspension of the converter provides for a substantially improved accessibility of the space below the converter, noting that such circumstantial manipulations as are required in connection with tapholes arranged on the bottom of converters are avoided on account of the jutty-shaped tapping means having burners incorporated therein.

BRIEF DESCRIPTION OF THE DRAWING

In the following, the invention is further explained with reference of the FIGURE of the drawing schematically showing an example of embodiment.

DETAILED DESCRIPTION OF THE PREFERRED EMBODIMENT

In the drawing, there is shown a tiltable converter 1, the swivelling axis of which is designated by the reference numeral 2. Gas burners 4 operated with natural gas are connected to the converter via an annular conduit and in proximity of the converter bottom, the flames 5 of said burners being essentially radially directed into the interior of the converter. The converter 1 can continuously be charged with scrap 6, for which purpose there is provided a charging chute 7.

Above the burner plane being formed by the burners 4, there is arranged a further annular conduit 8 for the supply of secondary air. On account of the burners 4 being sub-stoichiometrically operated with a λ-value of 0.8 to 0.9, the supplied fuels are completely burnt within the plane of secondary air.

A jutty-shaped tapping means 9 comprising an essentially radial channel 10 is connected to the converter bottom 3. This radial channel 10 of the jutty-shaped tapping means 9 is in alignment with a radial taphole 11 of the converter 1 and passes over into a channel 13 extending in essentially vertical direction and in parallel relation to the axis 12 of the converter 1. The substantially radial channel 10 has a greater free cross section than the tapping channel 13 extending in parallel relation to the axis 12, so that the radial channel 10 need not completely be filled when discharging the molten bath. It is of advantage if a free space is present above the outwardly flowing melt 14 and if burners 15 and 16 open into this free space and have the burner axes intersecting one another. The burner 15 serves the purpose of heating the radial channel 10, whereas the burner 16 prevents clogging of the vertical channel 13 by solidificating metal.

A sampling opening 17 is additionally connected to the radial channel 10, said sampling opening allowing to control the melting process.

A cover 18 is connected with the jutty-shaped tapping means 9 and can be swivelled in upward direction around the swivelling axis 2 together with the converter 1 and the jutty-shaped tapping means 9 if the ladle 19 having been moved therebelow shall be interchanged. The ladle 19 itself can be moved on rollers 20, and a separate slag receiving receptacle 21 is mounted on the chassis of the ladle 19 for the purpose of slag separation.

What is claimed is:

1. Apparatus for continuously forming a melt of scrap and/or pig iron and for discharging the melt into a mobile ladle, said apparatus comprising:

A converter having a bottom, radical taphole and an interior;

a plurality of burners (4), extending in essentially radial direction relative to said converter and arranged on the converter (1) within a first plane having an orientation parallel to said bottom of the converter and being located in proximity to said bottom (3) of the converter, for directing flames into the interior of the converter for sub-stoichiometric heating there;

a plurality of air nozzles arranged within a further plane located above the first plane for supplying secondary air for completing combustion; and tapping means (9) for discharging the melt from said converter into the mobile ladle (19), said tapping means being connected to the bottom of the converter via said radial taphole within the converter.

2. Apparatus as claimed in claim 1, wherein the tapping means (9) has a channel (10), aligned relative to said taphole of the converter and in a direction substantially radial relative to the converter, and a tapping channel (13) extending in essentially parallel relation to a vertical axis (12) of the converter (1) and being connected to the radially directed channel (10).

3. Apparatus as claimed in claim 1 or 2, wherein the tapping means (9) comprises at least one burner (15, 16) located such that its flame is directed towards one of said channels (10, 13) of the tapping means (9).

4. Apparatus as claimed in claim 2, wherein the radially directed channel (10) has a greater cross section than the tapping channel (13).

5. Apparatus as claimed in claim 1 or 2, wherein the tapping means (9) includes a cover (18) for the ladle (19) which is movable to a position below the tapping channel (13), said cover (18) being disposed at an exit end of said tapping means and being swivelable in common with the converter (1), said cover being adapted to be lifted off the ladle.

6. Apparatus as claimed in claim 3, wherein the tapping means further comprises:
   first and second burners (15, 16) located such that their flames are directed to intersect within said radially directed channel; and
   a closable sampling opening connected to said radial channel.

* * * * *